(12) United States Patent
Hiramatsu et al.

(10) Patent No.: US 11,988,404 B2
(45) Date of Patent: May 21, 2024

(54) INFRARED SENSOR MODULE, AIR CONDITIONER, AND AIR CONDITIONER CONTROL SYSTEM

(71) Applicant: PANASONIC INTELLECTUAL PROPERTY MANAGEMENT CO., LTD., Osaka (JP)

(72) Inventors: Takaaki Hiramatsu, Osaka (JP); Takanori Sugiyama, Osaka (JP); Hiroshi Yamanaka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 869 days.

(21) Appl. No.: 16/977,913

(22) PCT Filed: Mar. 14, 2019

(86) PCT No.: PCT/JP2019/010701
§ 371 (c)(1),
(2) Date: Sep. 3, 2020

(87) PCT Pub. No.: WO2019/188375
PCT Pub. Date: Oct. 3, 2019

(65) Prior Publication Data
US 2020/0400337 A1 Dec. 24, 2020

(30) Foreign Application Priority Data

Mar. 28, 2018 (JP) .................. 2018-062428

(51) Int. Cl.
*F24F 11/00* (2018.01)
*F24F 11/79* (2018.01)
(Continued)

(52) U.S. Cl.
CPC .............. *F24F 11/79* (2018.01); *G01J 5/10* (2013.01); *F24F 2110/10* (2018.01);
(Continued)

(58) Field of Classification Search
CPC ........ F24F 11/79; F24F 11/89; F24F 2120/12; F24F 11/64; F24F 11/77; F24F 2110/10;
(Continued)

(56) References Cited

U.S. PATENT DOCUMENTS

2003/0111605 A1 6/2003 Sato et al.
2010/0063636 A1 3/2010 Matsumoto et al.
(Continued)

FOREIGN PATENT DOCUMENTS

JP 2010-236879 A 10/2010
JP 2011-242129 A 12/2011
(Continued)

OTHER PUBLICATIONS

International Search Report and Written Opinion issued in International Patent Application No. PCT/JP2019/010701, dated Jun. 4, 2019; with partial English translation.
(Continued)

*Primary Examiner* — Ko-Wei Lin
(74) *Attorney, Agent, or Firm* — Rimon P.C.

(57) ABSTRACT

The present disclosure includes: an infrared sensor configured to detect an infrared ray and output a thermal image; a temperature sensor configured to detect a temperature of the infrared sensor; and a processor configured to process output signals of the infrared sensor and the temperature sensor, and the processor is configured to estimate a temperature distribution in a space between the infrared sensor and a background in a detection direction of the infrared sensor from a background temperature of the thermal image and the temperature of the infrared sensor.

14 Claims, 7 Drawing Sheets

1 INFRARED SENSOR MODULE
2 AIR CONDITIONER
3 INFRARED SENSOR
4 TEMPERATURE SENSOR
5 PROCESSOR
13 CONTROLLER
14 OUTPUTTER
15 LOUVER
16 COMPRESSOR
17 FAN

(51) Int. Cl.
*G01J 5/10* (2006.01)
*F24F 110/10* (2018.01)
*F24F 120/12* (2018.01)
*G01J 5/00* (2022.01)
*G01J 5/48* (2022.01)

(52) U.S. Cl.
CPC ... *F24F 2120/12* (2018.01); *G01J 2005/0077* (2013.01); *G01J 5/485* (2022.01)

(58) Field of Classification Search
CPC ...... F24F 11/74; G01J 5/10; G01J 2005/0077; G01J 5/0025; G01J 5/485
See application file for complete search history.

(56) References Cited

U.S. PATENT DOCUMENTS

| | | |
|---|---|---|
| 2012/0123593 A1 | 5/2012 | Matsumoto et al. |
| 2012/0123732 A1 | 5/2012 | Matsumoto et al. |
| 2014/0140368 A1* | 5/2014 | Yildizyan ............. G01J 5/0275 374/121 |
| 2014/0148706 A1 | 5/2014 | Van Treeck et al. |
| 2015/0247647 A1 | 9/2015 | Kusukame et al. |
| 2016/0109148 A1 | 4/2016 | Honda |
| 2017/0160141 A1* | 6/2017 | Yamanaka ................ G01J 5/48 |
| 2017/0370775 A1* | 12/2017 | Kusukame ................ G01J 5/10 |
| 2018/0238740 A1* | 8/2018 | Christel .................... G01J 5/53 |
| 2019/0084372 A1* | 3/2019 | Gallagher ............ A61B 5/6893 |

FOREIGN PATENT DOCUMENTS

| | | |
|---|---|---|
| JP | 2016-065848 A | 4/2016 |
| JP | 2016-080302 A | 5/2016 |
| JP | 2017-040407 A | 2/2017 |
| JP | 6167305 B2 | 7/2017 |
| WO | 2002/075262 A1 | 9/2002 |
| WO | 2015/122201 A1 | 8/2015 |

OTHER PUBLICATIONS

Chinese Office Action dated Jan. 31, 2024 issued in the corresponding Chinese Patent Application No. 1 201980019764.6, with English machine translation.

* cited by examiner

1 INFRARED SENSOR MODULE
2 AIR CONDITIONER
3 INFRARED SENSOR
4 TEMPERATURE SENSOR
5 PROCESSOR
13 CONTROLLER
14 OUTPUTTER
15 LOUVER
16 COMPRESSOR
17 FAN

INFRARED SENSOR MODULE, AIR CONDITIONER, AND AIR CONDITIONER CONTROL SYSTEM

CROSS-REFERENCE OF RELATED APPLICATIONS

This application is the U.S. National Phase under 35 U.S.C. § 371 of International Patent Application No. PCT/JP2019/010701, filed on Mar. 14, 2019, which in turn claims the benefit of Japanese Application No. 2018-062428, filed on Mar. 28, 2018, the entire disclosures of which Applications are incorporated by reference herein.

TECHNICAL FIELD

The present disclosure relates to an infrared sensor module for detecting an infrared ray, an air conditioner controlled in accordance with an output of the infrared sensor module, and an air conditioner control system.

BACKGROUND ART

An infrared sensor configured to detect an infrared ray and acquire a thermal image in a detection direction is known, and an air conditioner controlled based on the thermal image acquired by the infrared sensor is also known (Patent Literatures 1 and 2).

The infrared sensor in each of Patent Literatures 1 and 2, however, senses only a background temperature but cannot detect a temperature in a space between a background and the infrared sensor.

CITATION LIST

Patent Literature

Patent Literature 1 JP 2016-065848 A
Patent Literature 2: JP 6167305 B2

SUMMARY OF INVENTION

An object of the present disclosure is to provide an infrared sensor module which solves the problems described above and which is configured to estimate a temperature distribution in a space between an infrared sensor and a background in a detection direction of the infrared sensor.

To solve the problems described above, an infrared sensor module of the present disclosure includes: an infrared sensor configured to detect an infrared ray and output a thermal image; a temperature sensor configured to detect a temperature of the infrared sensor; and at least one processor configured to process output signals of the infrared sensor and the temperature sensor. The at least one processor is configured to estimate a temperature distribution in a space between the infrared sensor and a background in a detection direction of the infrared sensor from a background temperature of the thermal image and the temperature of the infrared sensor.

Moreover, an air conditioner of the present disclosure includes: the infrared sensor module; an air blower configured to blow air; and a controller configured to control at least one of an air direction or an air volume of the air from the air blower based on an output of the infrared sensor module. The controller is configured to control at least one of the air direction or the air volume of the air from the air blower based on the temperature distribution in the space between the infrared sensor and the background.

Furthermore, an air conditioner control system of the present disclosure includes: an infrared sensor module; an information processing device configured to process an output result of the infrared sensor module; and an air conditioner. The air conditioner includes: an air blower configured to blow air; and a controller configured to control at least one of an air direction or an air volume of the air from the air blower based on a process result of the information processing device. The infrared sensor module includes: an infrared sensor configured to detect an infrared ray and output a thermal image; a temperature sensor configured to detect a temperature of the infrared sensor; and at least one processor configured to process output signals of the infrared sensor and the temperature sensor. The infrared sensor module is configured to output a background temperature of the thermal image and a temperature of the infrared sensor from the at least one processor to the information processing device. The information processing device is configured to estimate a temperature distribution in a space between the infrared sensor and a background in a detection direction of the infrared sensor. The controller is configured to control at least one of an air direction or an air volume of the air from the air blower based on the temperature distribution.

DESCRIPTION OF EMBODIMENTS

An infrared sensor module, an air conditioner, and an air conditioner control system of an embodiment will be described below with reference to the drawings. Note that in each drawing, similar components are denoted by the same reference signs, and the description thereof will be omitted. Moreover, components in the embodiments may be accordingly combined with each other within a range involving no contradiction.

Moreover, according to another aspect, a signal output from an infrared sensor module is processed by an information processing device, and based on a process result, an air conditioner is controlled, which enables the air conditioner to be controlled with increased accuracy.

Embodiment

The infrared sensor module and the air conditioner of the embodiment will be described below with reference to the drawings.

Figure 1:
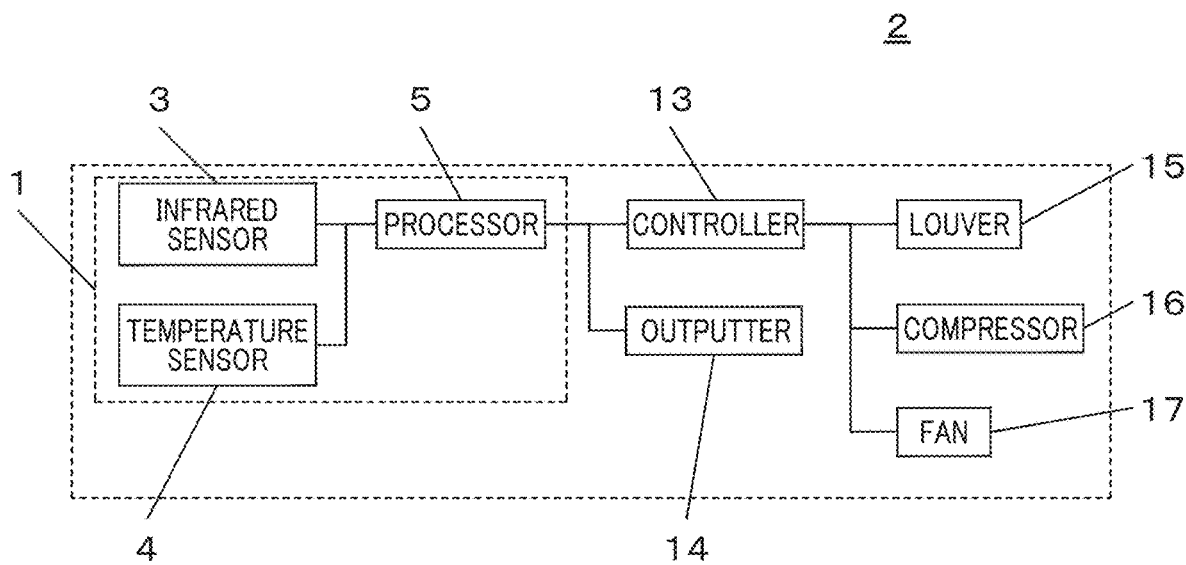
FIG. 1 is a view illustrating configurations of an infrared sensor module and an air conditioner including the infrared sensor module of an embodiment.
Figure 2:
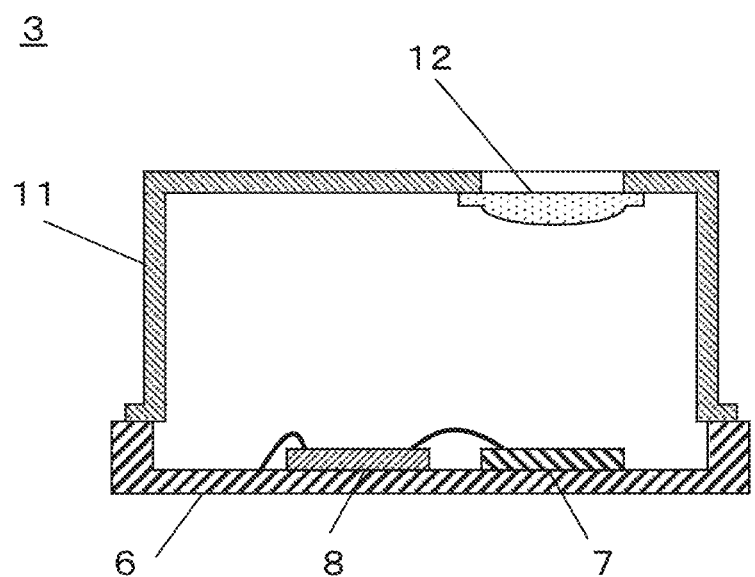
FIG. 2 is a sectional view illustrating an infrared sensor of the infrared sensor module.
Figure 3:
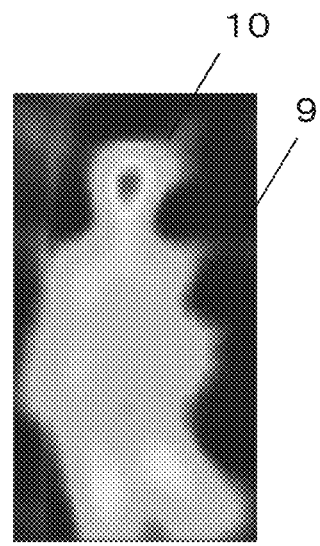
FIG. 3 is a view illustrating an example of a thermal image.
Figure 4:
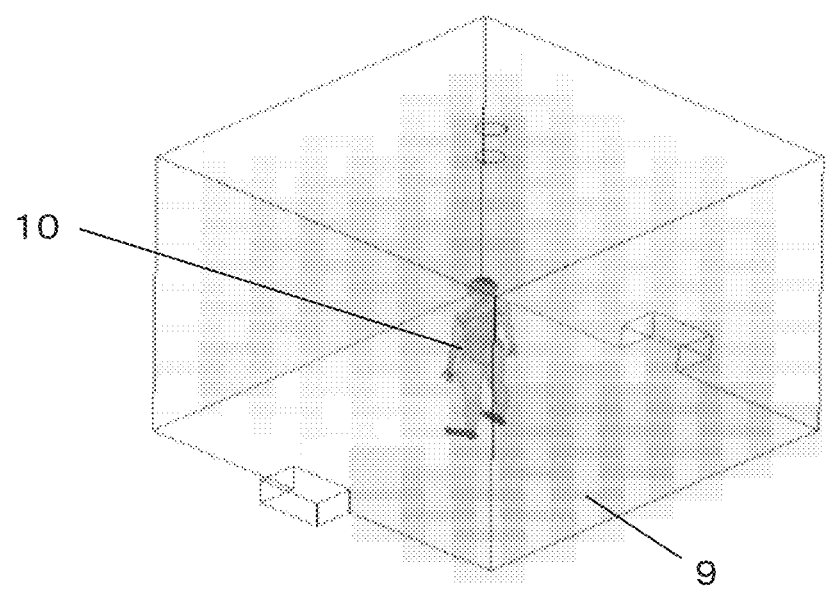
FIG. 4 is a view illustrating an example of display of a temperature distribution.
Figure 5:
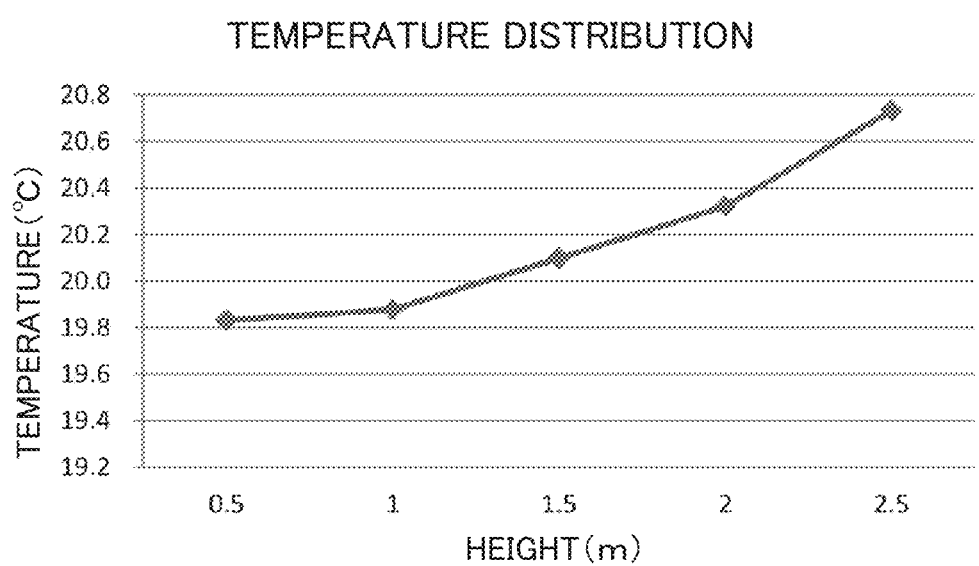
FIG. 5 is a view illustrating an example of a temperature distribution between a floor and the infrared sensor.

FIG. 1 is a view illustrating configurations of an infrared sensor module and an air conditioner including the infrared sensor module of an embodiment. FIG. 2 is a sectional view illustrating an infrared sensor of the infrared sensor module. FIG. 3 is a view illustrating an example of a thermal image. FIG. 4 is a view illustrating an example of display of a temperature distribution. FIG. 5 is a view illustrating an example of a temperature distribution between a floor and the infrared sensor. Specifically, FIG. 5 shows a temperature distribution estimated in a space between a floor and the infrared sensor in a room by the infrared sensor module provided on a ceiling of the room.

The infrared sensor module 1 is provided in an air conditioner 2. The infrared sensor module 1 is provided to face a floor. The air conditioner 2 is provided on the ceiling.

First of all, the infrared sensor module 1 will be described.

The infrared sensor module 1 includes an infrared sensor 3 configured to output the thermal image, a temperature sensor 4 configured to detect a temperature of the infrared sensor 3, and a processor 5 configured to process output signals of the infrared sensor 3 and the temperature sensor 4.

The infrared sensor 3 includes a substrate 6, an infrared detection element 7, a process circuit 8, and a case 11. The infrared detection element 7 and the process circuit 8 are provided on the substrate 6. The infrared detection element 7 and the process circuit 8 are accommodated in the case 11. Specifically, the infrared detection element 7 and the process circuit 8 are accommodated in a housing constituted by the substrate 6 and the case 11.

The infrared detection element 7 includes a thermal infrared detector in which a temperature sensor is embedded. As the temperature sensor, a thermoelectric converter is used. The thermoelectric converter includes a thermopile configured to convert thermal energy from an infrared ray emitted from a detection target into electrical energy. Moreover, the infrared sensor 3 includes a temperature sensor, a×b pixel sections (non-contact infrared sensor elements) including MOS transistors for extracting an output voltage of the temperature sensor, and a semiconductor substrate. The a×b pixel sections are arranged in a two-dimensional array of "a" rows and "b" columns on one surface of the semiconductor substrate. The infrared sensor 3 has 8×8 pixel sections. Note that the pixel sections are not limited to 8×8 pixel sections but may be, for example, 16×4 or 16×16 pixel sections. The description is given assuming that the infrared sensor 3 is fixed, but the orientation of the infrared sensor 3 may be changeable by a motor or the like. Moreover, the infrared sensor 3 may be movable by a motor or the like.

The circuit configuration of the process circuit 8 may be accordingly designed in accordance with the types and the like of the infrared detection element 7. The circuit configuration of the process circuit 8 may be a circuit configuration including, for example, a control circuit configured to control the infrared detection element 7, an amplifier circuit configured to amplify an output voltage of the infrared detection element 7, and a multiplexer configured to selectively input, to an amplifier circuit, an output voltage of pads provided for a plurality of inputs and electrically connected to pads provided for a plurality of outputs of the infrared detection element 7. The process circuit 8 generates the thermal image, and the thermal image is output from the infrared sensor 3. The process circuit 8 detects a background 9 such as a floor and a measurement target 10 such as a person from the thermal image. Here, the process circuit 8 extracts, as the measurement target 10, for example, an area corresponding to a pixel group showing a prescribed temperature range. The prescribed temperature range is, for example, a temperature range corresponding to a temperature of a person as the measurement target 10. The process circuit 8 extracts, as the background 9, an area in which the measurement target 10 is absent and which corresponds to a remaining pixel group. A plurality of prescribed temperature ranges may be set.

The case 11 is formed of a metal material such as SUS or plated iron plated with nickel. Note that the case 11 may be made of a ceramic material. The case 11 has an opening which is located in front of the infrared detection element 7 and at which a lens 12 is provided.

As the temperature sensor 4, a thermistor is used. The thermistor is provided in the vicinity of the infrared sensor 3. The temperature sensor 4 is configured to detect the temperature of the infrared sensor 3. Since the air conditioner 2 provided with the infrared sensor 3 is located on the ceiling, it is assumed that the temperature sensor 4 detects the temperature of the ceiling. Note that the temperature sensor 4 is not limited to the thermistor. For example, a diode may be provided on the substrate 6 of the infrared sensor 3, and the diode may serve as the temperature sensor 4. This configuration enables the temperature of the infrared sensor 3 to be detected with increased accuracy and enables the infrared sensor module 1 to be downsized.

As the processor 5, a microcontroller is used. The processor 5 receives output signals of the infrared sensor 3 and the temperature sensor 4. The processor 5 includes a storage (not shown). The storage is, for example, read only memory (ROM), random access memory (RAM), or electrically erasable programmable read only memory (EEPROM). The storage stores the background temperature, the temperature of the infrared sensor 3, and the temperature distribution in the space between the background 9 and the infrared sensor 3. The storage stores an algorithm for temperature distribution estimation. The algorithm is obtained from data obtained from an experiment. In the experiment, for example, an installation location of the infrared sensor 3 and a room temperature are variously changed, and in each case, a relationship among the temperature distribution, a floor temperature, and the temperature of the infrared sensor 3 are obtained. FIG. 5 shows a temperature distribution derived based on the algorithm, where the infrared sensor 3 is provided at a height of 2.5 m, the floor temperature is 19 degrees centigrade, and the temperature of the infrared sensor 3 is 20.7 degrees centigrade. In FIG. 5, temperatures at an interval of 0.5 m in the vertical direction under this condition are shown. When the installation location of the infrared sensor 3, the floor temperature, and/or the temperature of the infrared sensor 3 change, the temperature distribution changes.

The processor 5 acquires the background temperature of the thermal image from the output signal of the infrared sensor 3 and detects the temperature of the infrared sensor 3 from the output signal of the temperature sensor 4. A height at which the infrared sensor 3 is provided is set in the processor 5 in advance. The processor 5 selects which temperature distribution is to be read based on the height at which the infrared sensor 3 is provided. From a result of this selection, a temperature distribution between the background 9 and the infrared sensor 3 at the time of measurement is estimated based on the temperature distribution stored in the storage. This enables the processor 5 to estimate a temperature at the prescribed height and to output the temperature. When the set height (height at which the temperature is to be estimated) is 1.5 m, the temperature is estimated to be 20.1 degrees centigrade in the example in FIG. 5, and a signal representing a result of the estimation is output from the infrared sensor module. The temperature changes depending on the height from the floor in the same space. As the height from the floor increases, the temperature increases. However, as illustrated in FIG. 5, the temperature does not change linearly between the floor and the ceiling. Therefore, estimating a temperature at the set height based on the temperature distribution stored in the storage enables the temperature at the set height to be estimated with high accuracy. Moreover, in the case of a wide space, the temperature changes depending on the distance from a wall. Thus, estimating a temperature at the set height based on the temperature distribution stored in the storage enables the temperature at a location where the temperature is to be detected to be detected with increased accuracy. That is, the background 9 includes the floor, and the processor 5 detects (estimates) a temperature in an area above the floor of the entire space, and therefore, even when the space in which the infrared sensor module 1 is installed is a large space, the processor 5 can detect the temperature in the area corresponding to the detection target with high accuracy.

The process performed by the processor 5 will be further described. The storage of the processor 5 stores pieces of information on temperature distributions each of which is associated with the background temperature and the temperature of the infrared sensor 3 and which are temperature distributions in the space between the background 9 and the infrared sensor 3. The processor 5 extracts, from the storage, a temperature distribution corresponding to the background temperature of the thermal image acquired from the output signal of the infrared sensor 3 and the temperature of the infrared sensor 3 obtained from the output signal of the temperature sensor 4. For example, each of the pieces of information on the temperature distributions is associated with a value of the background temperature and a value of the temperature of the infrared sensor 3. Thus, the processor 5 extracts, from the storage, a temperature distribution whose associated values are closest to the value of the background temperature of the thermal image acquired from the output signal of the infrared sensor 3 and the value of the temperature of the infrared sensor 3 obtained from the output signal of the temperature sensor 4. The processor 5 defines the temperature distribution extracted as an estimation result of the temperature distribution in the space between the background 9 and the infrared sensor 3.

Moreover, the pieces of information on temperature distributions in the space between the background 9 and the infrared sensor 3 recorded in the storage include pieces of information on temperature distributions at heights from the background 9 in the space. That is, as illustrated in FIG. 5, the pieces of information on temperature distributions include pieces of information on temperatures in a plurality of areas at different heights from the background 9. The processor 5 estimates such a temperature distribution. That is, processor 5 estimates the temperature distribution associated with each height from the background 9. The processor 5 estimates a temperature distribution in at least a space which is part of the space between the background 9 and the infrared sensor 3 and whose height from the background 9 corresponds to the prescribed height (set height which will be described later).

Next, the configuration of the air conditioner 2 including the infrared sensor module 1 will be described.

The air conditioner 2 includes the infrared sensor module 1, a controller 13 configured to control the air conditioner 2 in accordance with an output of the infrared sensor module 1, and an outputter 14 configured to output the temperature distribution in the space.

The controller 13 receives a result of estimation performed by the infrared sensor module 1, and in accordance with the result of the estimation performed by the infrared sensor module 1, the controller 13 controls at least one of a louver 15, a compressor 16, or a fan 17 provided in the air conditioner 2. The controller 13 controls the louver 15, the compressor 16, and/or the fan 17 to control an air direction or an air volume of the air conditioner 2. The louver 15 and the fan 17 correspond to air blowers configured to blow air.

The outputter 14 is a display. The outputter 14 is connected to the processor 5. The outputter 14 displays the temperature distribution in the space. FIG. 4 shows an example of the temperature distribution in the space displayed on the outputter 14. In FIG. 4, as the temperature increases, the color is displayed darker. The way of display may be accordingly set. Since the temperature distribution in the space is displayed three-dimensionally, a difference in temperature due to the location and/or height in the space is clearly displayed.

A height at which the temperature is to be controlled is set in the air conditioner 2. Here, control is performed such that a temperature at a height of 1.5 in from the floor corresponds to the set temperature in the air conditioner 2. The description is given assuming that this height is the set height. That is, the set height is a prescribed height from the background 9 (floor). The controller 13 uses a temperature obtained by averaging temperatures at set height in a detection range of the infrared sensor 3 at the set height. That is, the controller 13 uses a temperature obtained by averaging temperatures in an area on a horizontal plane whose height from the floor is the set height within the detection range of the infrared sensor 3 as a "temperature at the set height" serving as a control target. The controller 13 controls the air direction or the air volume of the air conditioner 2 such that the temperature at the set height output from the infrared sensor module 1 corresponds to the set temperature set in the air conditioner 2. For example, it is assumed that when the set temperature set in the air conditioner 2 is 21 degrees centigrade, a temperature distribution as shown in FIG. 5 is obtained. In this example, the temperature at the set height is 20.1 degrees centigrade. That is, the temperature at the set height is lower than the set temperature (21 degrees centigrade which is a target value of the temperature at the set height. Therefore, the air conditioner 2 outputs warm air to warm the space. That is, in this case, the temperature of air output from the air conditioner 2 is increased. Note that the set temperature set in the air conditioner 2 is maintained. When the temperature at the set height from the floor reaches 21 degrees centigrade, the air direction or the air volume of the air conditioner 2 is adjusted such that the temperature is maintained. That is, the air direction or the air volume of the air conditioner 2 is adjusted such that the temperature at the set height (temperature estimated from the temperature distribution is maintained at 21 degrees centigrade. At this time, the temperature of the floor is lower than the temperature at the set height from the floor, but since the temperature at the set height is 21 degrees centigrade, a person can spend comfortable time in the space.

As described above, the infrared sensor module 1 of the embodiment is configured to estimate the temperature at a desired height with high accuracy, and the air conditioner 2 includes the infrared sensor module 1, which enables air conditioning to be controlled for increased comfortableness for people.

Variation of Embodiment

Variations of the infrared sensor module and the air conditioner will be described below with reference to the drawings.

Figure 6:
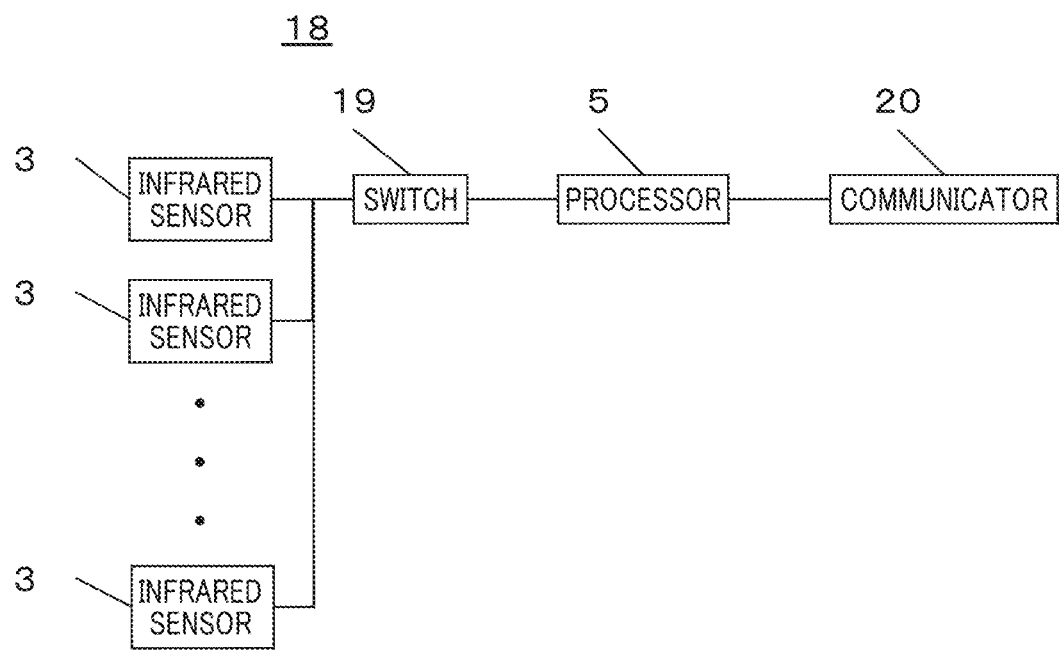
FIG. 6 is a view illustrating a variation of the infrared sensor module.
Figure 7:
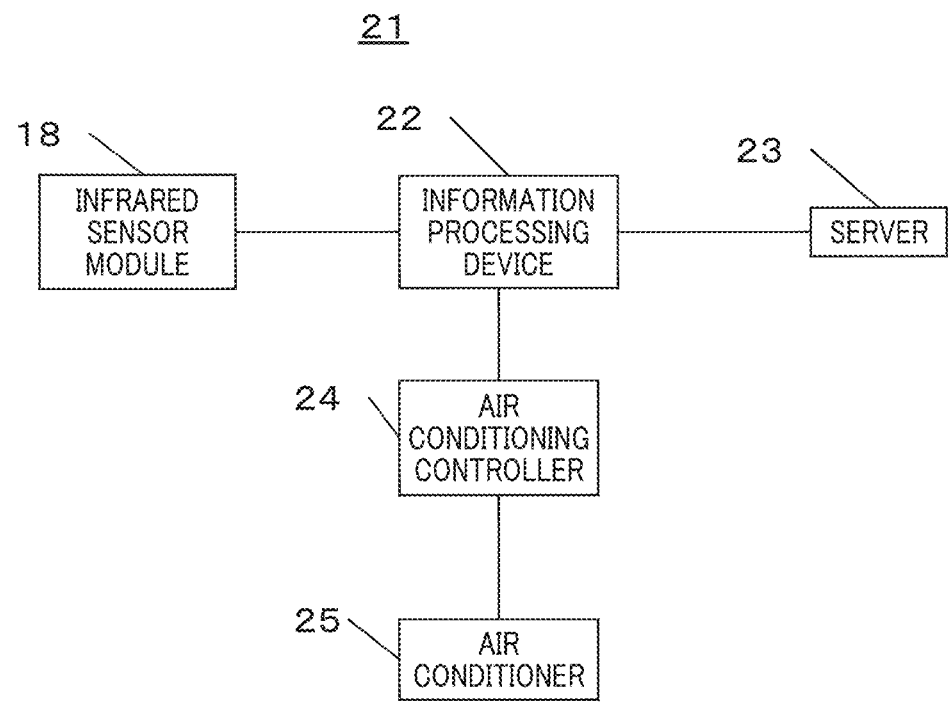
FIG. 7 is a view illustrating a configuration of an air conditioner control system of a second embodiment.

FIG. 6 is a view illustrating a variation of the infrared sensor module. FIG. 7 is a view illustrating a second embodiment of the air conditioner including the infrared sensor module.

The infrared sensor module 1 does not have to include all the elements of the first embodiment but is configured at least to detect the background temperature from the thermal image output from the infrared sensor 3, to detect the temperature of the infrared sensor 3 from the temperature sensor 4, and to estimate the temperature distribution in the space between the background 9 and the infrared sensor 3 based on the background temperature and the temperature of the infrared sensor 3.

Moreover, the air conditioner 2 does not have to include all the elements of the first embodiment as long as the air conditioner 2 is controlled based on the output of the infrared sensor module 1. Moreover, the air conditioner 2 does not have to be provided on the ceiling.

The infrared sensor module 1 is provided to face the floor but may be installed such that the wall is included in the background 9.

In the embodiment, an object which is to be the background 9 is an indoor object. However, the object which is to be the background 9 is not limited to this example but may be, for example, an outdoor wall or floor.

Based on the temperature distribution output from the processor 5, the controller 13 controls the air conditioner 2 by using the temperature at the set height set in the air conditioner 2, but the processor 5 may estimate the temperature at the set height and output the temperature to the controller 13. Moreover, the set height is 1.5 m but is not limited to this example, and the set height may be 1 m. Moreover, the set height may be freely set by a person. In this way, for example, a person who cares coldness of his/her feet may set the set height to a low height of, for example, 0.3 in, thereby improving comfortableness.

The processor 5 or the controller 13 may be configured to determine the head of a person from the thermal image and output a temperature at a head level of the person. In this way, the temperature is adjustable in accordance with the head level of the person without setting the set height in the air conditioner 2 in advance. This enables a temperature close to a temperature felt by a person to be output. Moreover, this enables the air conditioner 2 to be controlled in accordance with the head level of a person not only when the person is standing but also when the person is sitting.

In case of the presence of people, the controller 13 may control the air conditioner 2 individually for each person or may control the air conditioner 2 by averaging temperatures at the set height around the people. That is, the controller 13 may control the air conditioner 2 based on a temperature obtained by averaging temperatures at the set height around the people.

Moreover, the controller 13 may control the air conditioner 2 based on not only the temperature at the head level of a person but also a combination of the temperature at the head level of the person and the background temperature. In this way, it is possible to control the air conditioner 2 such that a person feels more comfortable.

The controller 13 averages temperatures at the set height in the entirety of the space to obtain an average temperature and uses the average temperature to control the air conditioner 2 but is not limited to this example. The controller 13 may perform control such that the temperature at the set height around a person corresponds to the set temperature. In this way, it is possible to further improve the comfortableness for a person. Moreover, the controller 13 may control the air conditioner 2 in accordance with the temperature at the set height at the center of the space. This enables the temperature in the space to be controlled while the influence of radiation from the wall is reduced.

The controller 13 may control both the air direction and the air volume. That is, the controller 13 controls at least one of the air direction or the air volume.

The outputter 14 does not have to display the temperature distribution in the space. The outputter 14 may display only a temperature at a location requested to the air conditioner 2 by a person. Moreover, the outputter 14 does not have to be a display but may be include, for example, a speaker, and the speaker may be configured to perform notification of the temperature at a prescribed location.

The configuration including the infrared sensor module 1 provided in the air conditioner 2 has been described, but the infrared sensor module 1 and the air conditioner 2 may be provided at different locations, and an output signal of the infrared sensor module 1 may be transmitted to the air conditioner 2 based on wireless communication or wired communication.

The description has been given assuming that the outputter 14 is provided in the air conditioner 2, but the outputter 14 may be separated from the air conditioner 2.

The configuration including only one infrared sensor 3 has been described, but this should not be construed as limiting. As illustrated in FIG. 6, a plurality of infrared sensors 3 may be provided in an identical room, and the infrared sensor module 18 may be configured to combine output signals of the plurality of infrared sensors 3 with each other to obtain a temperature distribution in the identical room. In FIG. 6, the temperature sensor 4 is not shown but is provided integrally with each of the infrared sensors 3. In this case, the plurality of infrared sensors 3 are connected to the processor 5 via a switch 19. The processor 5 is connected to a communicator 20. The communicator 20 transmits a detection result to the air conditioner 2. That is, the plurality of infrared sensors 3 are separated from the air conditioner 2. Providing the plurality of infrared sensors 3 enables a wide range of temperature distribution to be obtained as compared to a case where only one infrared sensor 3 is provided. Providing the plurality of infrared sensors 3 is effective because the difference between a temperature in the vicinity of the wall and a temperature at the center of the room increases as the size of the room increases.

The temperature sensor 4 of the embodiment detects, as the temperature of the infrared sensor 3, a temperature in the vicinity of the infrared sensor 3 but is not limited to this example, and the temperature sensor 4 may detect the temperature of the infrared sensor 3 itself.

Second Embodiment

An air conditioner control system of the second embodiment will be described below with reference to the drawings.

FIG. 7 is a view illustrating a configuration of the air conditioner control system.

In an air conditioner control system 21, an infrared sensor module 18 is connected to an information processing device 22 such as a personal computer, the information processing device 22 is connected to a server 23 and an air conditioning controller 24, and a control signal is sent from the air conditioning controller 24 to an air conditioner 25. That is, the air conditioning controller 24 serves as a controller configured to control an air direction or an air volume based on an estimation result of a temperature distribution in a space. The infrared sensor module 18 transmits data such as the location and the number of people, the temperature, and the like is transmitted to the information processing device 22. The information is accumulated on the server 23. In this case, the server 23 serves as the storage provided in the processor 5 described in the embodiment. That is, the infrared sensor module 18 only outputs a floor temperature and the temperature of the infrared sensor 3, and the server 23 estimates a temperature distribution based on an algorithm stored on the server 23. This configuration enables an increased number of pieces of data to be accumulated and control to be performed with increased accuracy, and therefore, it is possible to accurately control the air conditioner 25 even in a large room.

The processor 5 estimates the temperature distribution in the space, but this should not be construed as limiting. For example, the information processing device 22 may estimate the temperature distribution in the space.

INDUSTRIAL APPLICABILITY

The present disclosure enables estimation of a temperature distribution in a space between a background such as a floor and an infrared sensor and is thus useful for controlling air conditioners.

REFERENCE SIGNS LIST

1, 18 INFRARED SENSOR MODULE
2, 25 AIR CONDITIONER
3 INFRARED SENSOR
4 TEMPERATURE SENSOR
5 PROCESSOR
6 SUBSTRATE
7 INFRARED DETECTION ELEMENT
8 PROCESS CIRCUIT
9 BACKGROUND
10 MEASUREMENT TARGET
11 CASE
12 LENS
13 CONTROLLER
14 OUTPUTTER
15 LOUVER
16 COMPRESSOR
17 FAN
19 SWITCH
20 COMMUNICATOR
21 AIR CONDITIONER CONTROL SYSTEM
22 INFORMATION PROCESSING DEVICE
23 SERVER
24 AIR CONDITIONING CONTROLLER

The invention claimed is:

1. An infrared sensor module, comprising:
an infrared sensor configured to detect an infrared ray and output a thermal image, which includes a background temperature of the thermal image;
a temperature sensor configured to detect a temperature of the infrared sensor; and
at least one processor configured to process output signals of the infrared sensor and the temperature sensor,
the at least one processor being configured to estimate a temperature distribution in a space between the infrared sensor and a background in a detection direction of the infrared sensor based on the background temperature of the thermal image and the temperature of the infrared sensor.

2. An air conditioner, comprising:
the infrared sensor module of claim 1;
an air blower configured to blow air; and
a controller configured to control at least one of an air direction or an air volume of the air from the air blower based on an output of the infrared sensor module,
the controller being configured to control at least one of the air direction or the air volume of the air from the air blower based on the temperature distribution in the space between the infrared sensor and the background.

3. An air conditioner configured to be connected to the infrared sensor module of claim 1, the air conditioner comprising:
an air blower configured to blow air; and
a controller configured to control at least one of an air direction or an air volume of the air from the air blower based on an output of the infrared sensor module,
the controller being configured to control at least one of the air direction or the air volume of the air from the air blower based on the temperature distribution in the space between the infrared sensor and the background.

4. The air conditioner of claim 2, further comprising:
an outputter configured to output the temperature distribution in the space between the infrared sensor and the background.

5. The air conditioner of claim 4, wherein
the at least one processor is configured to estimate a head level of a person as a measurement target from the thermal image, and
the controller is configured to control at least one of the air direction or the air volume of the air from the air blower based on a temperature at the head level of the person.

6. The air conditioner of claim 5, wherein
the controller is configured to control at least one of the air direction or the air volume of the air from the air blower based on the background temperature and the temperature at the head level of the person.

7. The air conditioner of claim 2, wherein
the controller is configured to control at least one of the air direction or the air volume of the air from the air blower based on the temperature distribution such that a temperature in a space having a height of a prescribed height from the background is adjusted to a prescribed set temperature.

8. The air conditioner of claim 2, wherein
the infrared sensor module includes at least one additional infrared sensor,
the infrared sensor and the at least one additional infrared sensor are connected to the at least one processor, wherein the at least one processor includes only one processor.

9. An air conditioner control system, comprising:
an infrared sensor module;
an information processing device configured to process an output result of the infrared sensor module; and
an air conditioner,
the air conditioner including:
an air blower configured to blow air; and
a controller configured to control at least one of an air direction or an air volume of the air from the air blower based on a process result of the information processing device, the infrared sensor module including:
an infrared sensor configured to detect an infrared ray and output a thermal image;
a temperature sensor configured to detect a temperature of the infrared sensor; and
at least one processor configured to process output signals of the infrared sensor and the temperature sensor,
the infrared sensor module being configured to output a background temperature of the thermal image and a temperature of the infrared sensor from the at least one processor to the information processing device,
the information processing device being configured to estimate a temperature distribution in a space between the infrared sensor and a background in a detection direction of the infrared sensor,
the controller being configured to control the at least one of the air direction or the air volume of the air from the air blower based on the temperature distribution.

10. The air conditioner control system of claim 9, further comprising:
an outputter configured to output the temperature distribution in the space between the infrared sensor and the background.

11. The air conditioner control system of claim 9, wherein
the at least one processor is configured to estimate a head level of a person as a measurement target from the thermal image, and
the controller is configured to control at least one of the air direction or the air volume of the air from the air blower based on a temperature at the head level of the person.

12. The air conditioner control system of claim 11, wherein
the controller is configured to control at least one of the air direction or the air volume of the air from the air blower based on the background temperature and the temperature at the head level of the person.

13. The air conditioner control system of claim 9, wherein
the controller is configured to control at least one of the air direction or the air volume of the air from the air blower based on the temperature distribution such that a temperature in a space having a height of a prescribed height from the background is adjusted to a prescribed set temperature.

14. The air conditioner control system of claim 9, wherein
the infrared sensor module includes at least one additional infrared sensor,
the infrared sensor and the at least one additional infrared sensor are connected to the at least one processor, wherein the at least one processor includes only one processor.

* * * * *